United States Patent
Shah et al.

(10) Patent No.: US 7,323,148 B2
(45) Date of Patent: Jan. 29, 2008

(54) HYDROGEN GENERATOR

(75) Inventors: Shailesh A. Shah, Eatontown, NJ (US); Michael T. Kelly, Plainsboro, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 419 days.

(21) Appl. No.: 10/701,692

(22) Filed: Nov. 5, 2003

(65) Prior Publication Data

US 2004/0120889 A1 Jun. 24, 2004

Related U.S. Application Data

(60) Provisional application No. 60/454,297, filed on Mar. 13, 2003, provisional application No. 60/423,865, filed on Nov. 5, 2002.

(51) Int. Cl.
*B01J 8/02* (2006.01)
*B01J 7/00* (2006.01)
*C01B 3/00* (2006.01)

(52) U.S. Cl. .............. 422/211; 422/222; 422/239; 423/657

(58) Field of Classification Search .............. None
See application file for complete search history.

(56) References Cited

U.S. PATENT DOCUMENTS 3,505,180 A * 4/1970 Brogden ............... 205/170

(Continued)

FOREIGN PATENT DOCUMENTS

WO    WO 0174710 A1 * 10/2001

OTHER PUBLICATIONS

Champagnie A. M. et al., "A High Temperature Catalytic Membrane Reactor for Ethane Dehydrogenation", Chemical Engineering Science, Oxford, GB, vol. 45, No. 8, 1990, pp. 2423-2429.

(Continued)

*Primary Examiner*—Glenn Caldarola
*Assistant Examiner*—Jennifer A. Leung
(74) *Attorney, Agent, or Firm*—Dickstein Shapiro LLP

(57) ABSTRACT

A hydrogen generator capable of operating in any orientation and having no moving parts includes a catalyst retaining structure. The catalyst retaining structure is disposed in a housing and serves to separate the housing into a fuel holding portion and a hydrogen chamber. The catalyst retaining structure also includes one or more pores, each pore being in communication with the fuel holding and hydrogen chambers. A catalyst, that promotes the generation of hydrogen gas upon contact with the fuel, is disposed within the pores. The fuel enters the pores and thereupon generates hydrogen gas which passes into the hydrogen chamber. Contact of the fuel with the catalyst in the pores may be controlled and the position of the fuel-hydrogen interface within the pore may be moved so as to regulate the generation of hydrogen. The catalyst retaining structure can take different forms, including one or more hollow elongated members or plates, and may further incorporate hydrophobic and/or hydrophilic membranes.

4 Claims, 10 Drawing Sheets

U.S. PATENT DOCUMENTS

| | | | |
|---|---|---|---|
| 4,175,153 A | * | 11/1979 | Dobo et al. ............... 428/398 |
| 4,266,026 A | | 5/1981 | Breslau |
| 5,110,478 A | * | 5/1992 | Haag et al. ............... 210/650 |
| 5,186,902 A | * | 2/1993 | Plester ...................... 422/112 |
| 5,202,517 A | | 4/1993 | Minet et al. |
| 5,328,610 A | | 7/1994 | Rogut |
| 2001/0045364 A1 | | 11/2001 | Hockaday et al. |
| 2004/0191588 A1 | | 9/2004 | Eshraghi et al. |
| 2005/0058595 A1 | | 3/2005 | Shi et al. |

OTHER PUBLICATIONS

"Catalytic Membranes Beckon" Chemical Engineering Progress, American Institute of Chemical Engineers, New York, US, vol. 90, No. 11, Nov. 1, 1994, pp. 13-14, 17-19.

Julbe A. et al., "Porous Ceramic Membranes for Catalytic Reactors—Overview and New Ideas", Journal of Membrane Science, Elsevier Science, Amsterdam, NL, vol. 181, No. 1, Jan. 15, 2001, pp. 3-20.

* cited by examiner

HYDROGEN GENERATOR

REFERENCE TO RELATED APPLICATIONS

The present application is based upon and hereby claims priority from Provisional Patent Application 60/423,865 filed Nov. 5, 2002 and Provisional Patent Application 60/454,297 filed Mar. 13, 2003.

TECHNICAL FIELD

The present invention relates to an apparatus which generates hydrogen by exposing a fuel solution to a catalyst and more particularly, to such a generator which uses a porous catalyst retaining structure.

BACKGROUND OF THE INVENTION

The development of fuel cells as replacements for batteries in portable electronic devices, including many popular consumer electronics such as personal data assistants, cellular phones, and laptop computers, is dependent on finding a convenient and safe hydrogen source. The technology to create small-scale systems for hydrogen supply, storage, and delivery has not yet matched the advancements in miniaturization achieved with PEM fuel cells.

A hydrogen fuel source for small applications needs to have a compact, lightweight construction, should contain a fuel with a high gravimetric storage density, and must operate in many orientations. Additionally, it should be easy to match control of the system's hydrogen flow rate and pressure to the operating demands of the fuel cell.

A hydrogen fuel source in liquid form is ideal for small hydrogen generation applications as it is readily adaptable for use with a small fuel tank filled with the liquid fuel. The hydrogen generated may be supplied to a fuel cell for the generation of electricity. This form of electrical generation is portable and, therefore, is oftentimes preferable to the generation of electricity using a rechargeable battery which must be periodically connected to an AC electric supply or the like for battery recharging. The existing hydrogen storage options, which include compressed and liquid hydrogen, hydrided metal alloys, and carbon nanotubes, have characteristics which complicate their use in small consumer applications. For instance, compressed hydrogen and liquid hydrogen require heavy tanks and regulators for storage and delivery, metal hydrides require added heat to release their stored hydrogen, and carbon nanotube systems must be kept pressurized.

Alternatives for hydrogen storage and generation include the class of compounds known as chemical hydrides, such as the alkali metal hydrides, the alkali metal aluminum hydrides, and the alkali metal borohydrides. The hydrolysis reactions of many complex metal hydrides, including sodium borohydride ($NaBH_4$), have commonly been used for the generation of hydrogen gas.

Sodium borohydride can be dissolved in alkaline water solutions with virtually no reaction. Furthermore, aqueous sodium borohydride fuel solutions are non-volatile and will not burn. This imparts handling and transport ease both in the bulk sense and within the hydrogen generator itself.

In those applications where a steady and constant supply of hydrogen is required, it is possible to construct hydrogen generation apparatus that control the contact of a catalyst with the hydride fuel. Such generators typically use a two-tank design, one for fuel and the other for the borate product. Hydrogen generation reaction takes place in a third chamber that contains a metal catalyst and connects the two tanks. However, such two-tank designs are not typically directionally independent and are not amenable to miniaturization.

An additional alternative for hydrogen storage and generation is the use of liquid hydrocarbons, including alcohols such as methanol and cyclohexanes. In the presence of appropriate catalysts, these compounds can be reformed to produce hydrogen.

The object of the current invention is a compact, self-regulating orientation-independent hydrogen generation system based on the catalytic hydrolysis and/or dehydrogenation of a liquid fuel, such as a liquid hydrocarbon fuel or as a chemical hydride solution. Contact of these fuels with a catalyst will produce hydrogen.

SUMMARY OF THE INVENTION

The present invention provides a compact, orientation independent and self-regulating hydrogen generating system having no moving parts. In accordance with the present invention, the hydrogen gas generating system includes a housing having a catalyst retaining member that separates a fuel holding chamber from a hydrogen chamber. A catalyst that promotes the generation of hydrogen gas upon contact with the fuel is disposed within at least one pore in the catalyst retaining member. The catalytic process may be the catalytic hydrolysis of a metal borohydride solution or the catalytic dehydrogenation or reformation of an alcohol, such as methanol. Each pore in the catalyst retaining member is in communication with the fuel holding and hydrogen chambers. The fuel is in contact with the exterior surface and its molecules can move to such surface without the use of capillary action. The fuel moves into the pores and contacts the catalyst thereupon generating hydrogen gas. In the disclosed embodiments, the catalyst retaining member can take different forms, including one or more hollow elongated members or plates. In addition, the position of the hydrogen fuel interface within the pore can be varied thus regulating the rate of hydrogen generation.

Advantageously, the fuel holding chamber can be accessed through one or more inlet ports to add fuel as needed. For those fuels that also result in the formation of a non-gaseous product, e.g., sodium borate from sodium borohydride, one or more outlet ports can serve to discharge this material. These ports can be used to wash the device with water or other suitable solvent between fuel refills, to prevent build-up of reaction product within the device. The present invention is also adaptable for use in applications where continuous hydrogen production is desired. In such case, a reservoir can be connected to the fuel holding chamber of the hydrogen generating system to provide a continuous supply of fresh fuel. By circulating the fresh fuel through this chamber spent fuel is removed as fresh fuel is added. The present invention may also be incorporated permanently into a hydrogen consuming device, e.g., a fuel cell where fuel may be added as needed. Or, the generator can be provided as a separate module which is detachable from the hydrogen consuming device.

DESCRIPTION OF THE INVENTION

Figure 1:
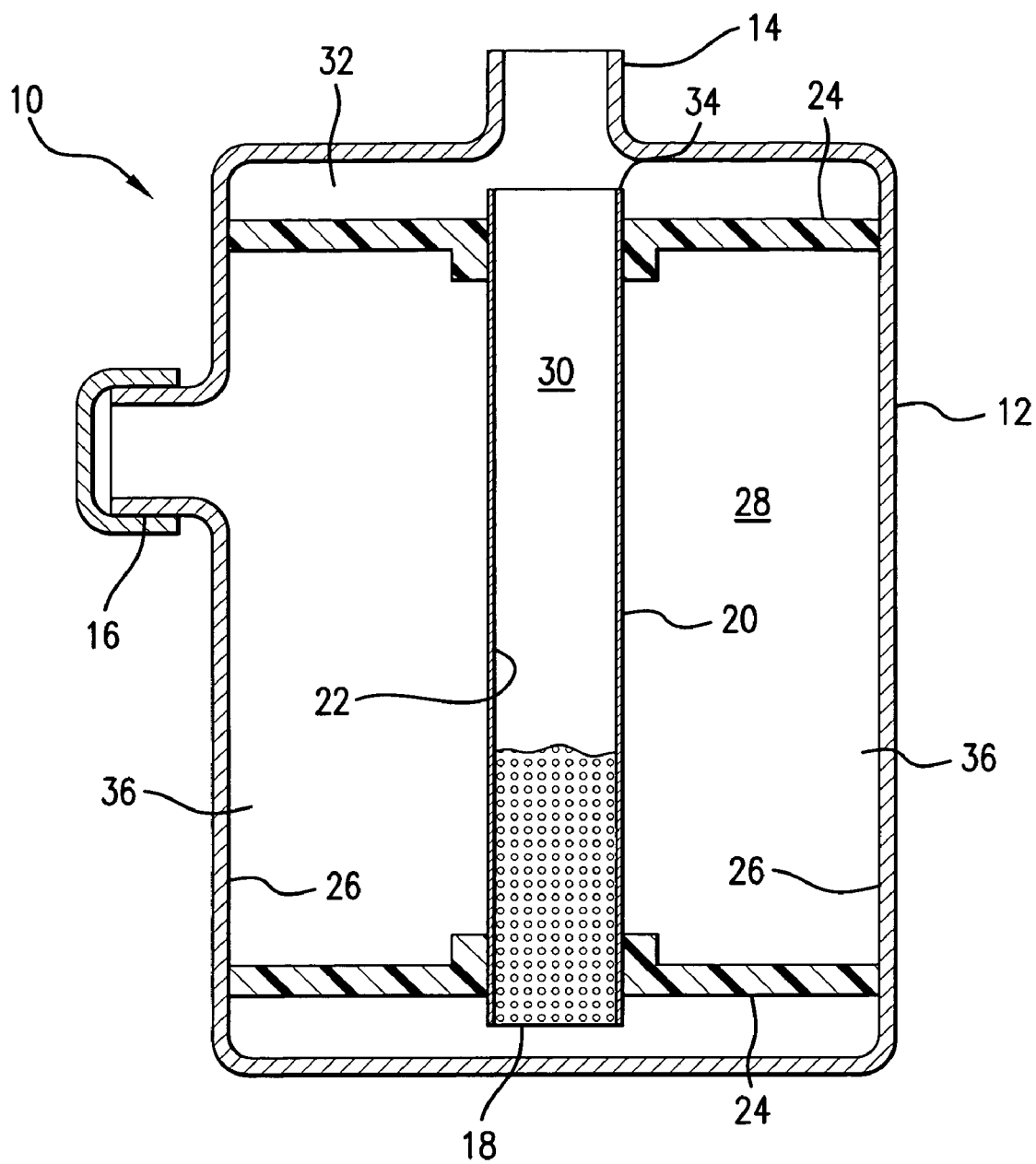
FIG. 1 is a side cross-sectional view of a hydrogen gas generation system in accordance with a first embodiment of the present invention.

Refer now to FIG. 1 which shows a cross-sectional view of an illustrative hydrogen gas generation system 10. The hydrogen gas generation system 10 includes a housing 12 having an outlet 14 for removal of the hydrogen gas generated within the housing 12 and a port 16 that can be used to add a fresh fuel solution to the housing 12 or to remove spent fuel solution therefrom as will be later explained below. A catalyst retaining member or reactor member comprising a microporous hollow fiber 18 is positioned within housing 12. Fiber 18 has a first exterior surface 20 and a second exterior surface 22.

The microporous hollow fiber 18 is held in its position within the housing 12 by seals 24 that are spaced apart along the longitudinal axis of the microporous hollow fiber 18 and the seals 24 may be comprised of epoxy or other sealing material that forms a tight seal against the first exterior surface 20 of the microporous hollow fiber 18 and the interior surface 26 of the housing 12.

Thus, the microporous hollow fiber 18 serves to separate the housing 12 into a fuel holding chamber 28 and a hydrogen chamber 30, the latter being connected to outlet 14. Outlet 14 couples hydrogen gas from the hydrogen gas generation system 10 to a storage tank or a hydrogen consuming system, such as a fuel cell. An intermediate chamber, designated in FIG. 1 as hydrogen gas accumulation chamber 32 may also be provided. Chamber 32 is located between the discharge end 34 of the microporous hollow fiber 18 and the outlet 14.

It should be understood that while only one microporous hollow fiber 18 is illustrated, a hydrogen generation system pursuant to the present invention may include a plurality of such fibers arranged into a bundle or package. In any event, in the embodiment of FIG. 1, the hydrogen gas generation system 10 is basically of a shell and tube type of construction where the fuel is located in the fuel holding chamber 28 that is on the shell side of the microporous hollow fiber 18 and the hydrogen chamber 30 is located on the tube side of such fiber. Further, in this embodiment, the first exterior surface 20 may be a hydrophilic surface that faces the fuel solution 36 contained within the fuel holding chamber 28 and the second exterior surface 22 may be a hydrophobic surface that faces the hydrogen chamber 30. While the present embodiment utilizes a first exterior surface 20 that is hydrophilic and a second exterior surface that is hydrophobic, other arrangements are possible. For example, as will be described below with respect to other embodiments of the present invention, the first exterior surface may be hydrophobic and the second exterior surface may be hydrophilic, or both of these surfaces may be hydrophobic, or both the first and second exterior surfaces may be neither hydrophobic nor hydrophilic.

It should also be noted that the section of the microporous hollow fiber intermediate the seals 24 is always immersed in the fuel solution 36 in any orientation of the housing 12 and, as will be described there will be hydrogen gas generated in any such orientation.

Figure 1A:
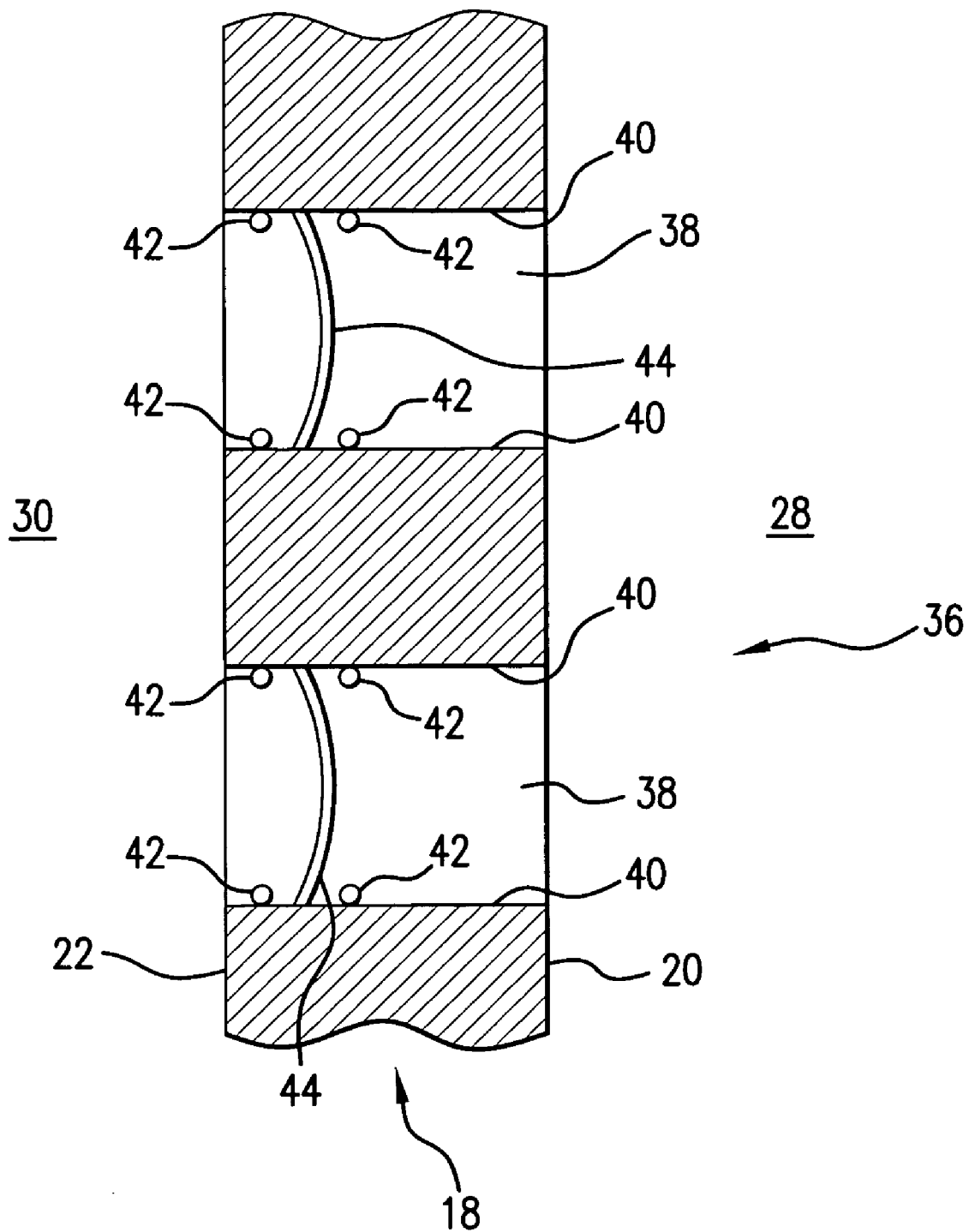
FIG. 1A is an enlarged cross-sectional view of an illustrative pore in a portion of fiber 18 in the hydrogen gas generation system of FIG. 1.

Referring now to FIG. 1A, a cross sectional view of typical pores 38 formed in the microporous hollow fiber 18 are shown. Each pore 38 has an internal wall 40 with a hydrogen generation catalyst disposed on the internal wall 40, shown in the form of catalyst particles 42.

At this point the overall operation of the hydrogen generation system 10 can be explained with reference to the construction and functioning thereof. Hydrogen generators of the present invention are constructed by using at least one hollow microporous hollow fiber 18 assembled in a "shell and tube" configuration. Any porous material that has substantially permanent pores, good physical stability, and can be fabricated in a tubular or hollow fiber form may be used as the catalyst retaining structure. Indeed, as will also be described the present invention is not limited to hollow fiber catalyst retaining structures. Instead, such structure can be fabricated using at least one flat plate having one or more pores into which catalyst is disposed.

Thus, the microporous catalyst retaining structure may be constructed from ceramic, silicon, silicate, plastic or metallic hollow microporous tubes or plates made by microfabrication techniques, like the well-known Micro-Electro-Mechanical Systems (MEMS) technique, to produce microchannels. The cross-sectional geometry of the pores 38 in the walls of the microporous hollow fibers 18 is not constrained and may be of a variety of shapes, e.g., cylindrical or conical. Thus the pore cross-section may be uniform or non-uniform, the later varying either gradually or abruptly from the first exterior surface 20 to the second exterior surface 22 of a microporous hollow fiber 18. Surface properties of the interior walls 40 may be further modified by depositing or coating this surface with either hydrophobic or hydrophilic materials. The surface properties of the interior walls 40 may also be varied by laminating or grafting microporous plates made from the desired materials to make a composite structure.

In addition, hollow fiber or flat plate membranes, such as those widely used in gas/liquid and liquid/liquid separation applications which offer a high membrane surface area to volume ratio, can be utilized for the catalyst retaining structure. Typical hydrophilic or hydrophobic hollow fibers or plates may be made from polymers such as polypropylene, polyacrylonitrile, polyvinylindenedifluoride (PVDF), polyethersulfone, polytetrafluoroethylene (PTFE), or polyethylene. The material can be selected for various characteristics including its hydrophobicity or hydrophilicity, hollow fiber lumen diameter, wall thickness, pore size, membrane surface area per unit volume, and the compatibility of the membrane and module materials with the hydrogen generating fuels.

The catalyst for hydrogen generation is deposited in targeted sections in the interior walls 40 of the pores 38.

Composite pore walls can be made by assembling a plurality of microporous structures with catalyst deposits on one or more of the component structures. The location of the catalyst component structure can be varied to restrict the catalyst in only the select section of the composite structure.

Refer back now to FIGS. 1 and 1A. The microporous hollow fibers 18 operate by utilizing surface energy gradients in its pores 38. A surface energy gradient implies a variation in the surface property of a material (e.g., the surface of the interior wall 40 of a pore 38) such that there is a gradual change in the wettability property of the material by a liquid (e.g., the fuel solution), or the contact angle of the liquid with the surface. Thus, repelling surfaces (e.g., a hydrophobic surface in the case of an aqueous fuel solution) will have a contact angle of greater than 90° with the liquid (i.e., the liquid will bead on the surface) and wetting surfaces (e.g., a hydrophilic surface in the case of an aqueous fuel) will have a contact angle of zero with the liquid (i.e., the liquid will coat the surface).

A surface energy gradient covers the range between these two extremes. Thus, a surface energy gradient along the interior wall 40 of a pore 38 will result in a liquid presenting different contact angles along the surface of the interior wall 40, specifically changing from wetting (having a zero contact angle) at one end of a pore 38, to being completely non-wetting (having a contact angle greater than 90°) at the other end of a pore 38, and spreading with a contact angle less than 90° in between.

A surface energy gradient can be achieved through the use of asymmetric fibers, that is, a fiber which has both a hydrophobic and hydrophilic side. One surface of a hollow fiber may be modified to produce such an asymmetric fiber. In the case of hydrophobic fibers (e.g., polypropylene, PTFE, or polyethylene), one side of the fiber surface is rendered hydrophilic by treatment with an oxidizing agent such as chromic acid or sulfuric acid or corona ion discharge. Alternatively, two polymers with different characteristics could be grafted together to provide the asymmetric fiber.

Alternatively, control can be achieved without the use of asymmetric fibers or a surface energy gradient. For instance, in microchannels, the penetration depth of the fuel into the pores 38 is dependent on the following factors: the static pressure differential on either side of the liquid column in the pore, the radius of the pores, the contact angle of the fuel with the pore surface, and the surface tension of the fuel-hydrogen interface. Thus, by using nonlinear pores, such as conical or cylindrical pores through the microporous hollow fiber 18, it is possible to establish a moveable hydrogen-fuel interface whose position can be varied along the pore so as to move to or from the second exterior surface 22 of fiber 18. This same movable hydrogen-fuel interface can also be provided in a flat plate catalyst retaining structure in embodiments of the present invention that will be described hereinbelow.

It is preferable if the hydrogen gas generation system 10 is fabricated so as to reduce the diffusional path length of the fuel to the catalyst in the pores 38. One way of providing this reduction is to utilize a plurality of microporous hollow fibers 18. Indeed, in the embodiment of FIG. 1, the diffusional path length decreases several-fold as the number of microporous hollow fibers 18 increases. Or, in the embodiment of FIG. 2 to be described, the reduction in diffusional path length decreases several-fold as the diameter of the microporous hollow fibers 18 is reduced. The use of a multitude of microporous hollow fibers 18 in a single module also increases the pore surface area to module volume ratio in the configuration.

Referring back to FIGS. 1 and 1A, the catalyst particles 42 are deposited in the pores 38 in the interior walls 40 of the microporous hollow fibers 18. The following process describes the deposition of a transition metal in the pores 38 of an asymmetric microporous hollow fiber 18 which illustratively has a hydrophilic first exterior surface 20 and a hydrophobic second exterior surface 22.

The process is applicable to the deposition of any transition metal. Preferably, the metal is ruthenium, cobalt, nickel, palladium, platinum, molybdenum, manganese, iron, chromium, or zinc, utilized either individually or in mixtures. An aqueous solution of a transition metal salt, for example, ruthenium chloride, cobalt chloride, zinc chloride, molybdenum chloride, or a mixture of such salts when mixed metal systems are desired, is prepared in a concentration relative to the surface area of the pores 38 and the concentration of the deposit required. This solution is flowed to contact the hydrophilic first exterior surface 20 of the microporous hollow fiber 18. The depth of penetration into the fiber pores 38 is determined by the hydrophilicity of the surface of the interior wall 40, the pressure of the aqueous stream, the radius of the pore 38, and the surface tension of the catalyst containing solution. Thus, the solution can penetrate only partially into the pore 38 and not flow through the entire length of the pore 38 to the second exterior surface 22.

A solution of a reducing agent in an organic solvent that is immiscible with water is flowed on the second exterior surface 22, i.e., the hydrophobic side of the microporous hollow fiber 18. Suitable reducing agents include, but are not limited to, the chemical hydrides such as sodium borohydride. The depth of penetration of the reducing solution into a pore 38 is controlled by the hydrophobicity of the surface of the interior wall 40, the pressure of the solvent stream, the radius of the pore 38, and the surface tension of the reducing agent solution. Thus, the solution can penetrate only partially into the pore 38 and not flow through the entire length of the pore 38 to the first exterior surface 20.

The aqueous solution of the catalyst salt and the organic solution of the reducing agent will form an interface 44 inside the pores 38 of the microporous hollow fiber 18 that is relative to the pressures of the two input streams and the relative surface energy gradient of the pore interior walls 40. This location of the interface 44 can be displaced by adjusting the relative pressure of the two streams. For example, to locate the interface 44 towards the second exterior surface 22, the pressure of the aqueous stream or within the fuel holding chamber 28 can be increased relative to the pressure of the organic stream within the hydrogen chamber 30. The relative pressure differential can be calculated from the surface energy of the substrate and the pore radius, and the surface energy of the solutions containing both the catalyst salt and the reducing agent.

The solutes (the catalyst salt and the reducing agent) can diffuse from one solvent liquid to another at the interface 44. That is, they will diffuse across the interface 44 and react to deposit the catalyst particles 42 on the pore interior wall 40 close to the interface 44. If the deposit is desired in the hydrophobic zone of the pore interior wall 40, the pressure of the aqueous stream must be greater than the pressure of the organic stream to push the interface 44 in the pore 38 towards the hydrophobic side or second exterior surface 22.

The concentration of the reducing agent in solution can be adjusted to a low level, to limit its diffusion path length beyond the interface 44. Thus, the catalyst reduction zone will extend to a distance that is determined by the diffusion path length of the catalyst salt in the reducing agent solution. The flow rate of the two streams can be also adjusted to vary the diffusional penetration of the metal catalyst salt and/or the reducing agent across the interface 44. By adjusting the pressure, flow rate and concentration of the two streams, the reduction and subsequent deposition of the catalyst particles 42 can be localized in a targeted zone in the pore 38.

Hydrogen gas can be used as the reducing agent as an alternative to a liquid solution. The pressure of the hydrogen gas will control the location of the interface 44 in the pore 38 and determine where the reduced catalyst will deposit. It is also possible to dissolve the catalyst salt solution in an organic solvent and flow it through the tube side and flow an aqueous solution of the reducing agent through the shell side. In this case again, the location of the interface 44 and the subsequent deposition of the catalyst particle 42 in the targeted region in the pore 38, can be controlled by adjusting the pressure, flow rate and concentration of the two streams.

The process described is not limited to asymmetric polymeric membranes and can be adapted for the targeted deposition of a variety of metals on any polymeric or metallic porous substrates. In those cases, the metal catalyst salt solution can be immobilized in conical pores of the microporous substrate by adjusting the relative pressures of the opposite streams. The surface energy of the substrate and the pore radius determine the relative pressure differential necessary The metal hydride fuel component useful in the disclosed systems can be a complex metal hydride that is water soluble and stable in aqueous solution. Examples of suitable metal hydrides are those having the general formula $MBH_4$, where M is an alkali or alkaline earth metal selected from Group 1 or Group 2 of the periodic table, such as lithium, sodium, potassium, calcium, and magnesium. Examples of such compounds include without intended limitation $NaBH_4$, $LiBH_4$, $KBH_4$, $Ca(BH_4)_2$, and $Mg(BH_4)_2$. These metal hydrides may be utilized in mixtures, but are preferably utilized individually. Preferred for such systems in accordance with the present invention is sodium borohydride ($NaBH_4$). Hydrogen generation in hollow tube modules can also be accomplished with liquid hydrocarbon fuels that will release hydrogen upon contacting a suitable catalyst, or with liquid fuels that require the combination of two or more liquid components to release hydrogen. Essentially any fuel that is substantially in liquid form that releases hydrogen upon contacting a catalyst or upon mixing with another liquid component can be used.

The use of sodium borohydride for hydrogen generation is particularly desirable for certain applications. It has been found that the hydrogen gas produced from the hydrolysis of sodium borohydride is typically of high purity with no carbon-containing impurities; no carbon monoxide has been detected in gas streams produced. This is noteworthy because most fuels cells, notably PEM and alkaline fuel cells, require high quality hydrogen gas and the presence of carbon monoxide or other impurity in the hydrogen stream will poison the catalyst and eventually corrupt the fuel cell. Other methods of generating hydrogen, such as fuel reforming of hydrocarbons, provide a hydrogen gas stream containing carbon monoxide and further processing is then required to remove it. In addition, the hydrogen gas produced by sodium borohydride has high relative humidity. This is particularly useful in PEM fuel cells, which require moisture to prevent the polymer membrane from drying out.

The hydrolysis of sodium borohydride releases hydrogen as shown in Equation 1. The boron-containing product of this reaction is sodium metaborate, which could be regenerated into borohydride for future use.

$$NaBH_4(aq)+2H_2O(l)\rightarrow NaBO_2(aq)+4H_2(g) \qquad (1)$$

The rate of decomposition of sodium borohydride into hydrogen gas and a sodium metaborate is pH dependent, with higher pH values hindering the hydrolysis. Accordingly, a stabilizer (such as sodium hydroxide (NaOH)) is typically added to solutions of sodium borohydride in water to be used as the fuel from which the hydrogen gas is generated.

As the hydrolysis of sodium borohydride is typically slow at room temperature, heat or a catalyst, e.g., acids or a variety of transition metals, can be used to accelerate the hydrolysis reaction. Transition metals from the nickel, cobalt, and iron families generally show the highest activity, and the metals or the corresponding metal salts or metal borides can be used in solution or as suspensions, or such salts, borides or metals can be deposited on inert substrates. In the system of the present invention, the catalyst is deposited in the pores or microchannels of the hollow reactors.

Accordingly, in the FIGS. 1 and FIG. 1A embodiment, the first exterior surface 20 of the microporous hollow fiber 18 faces and is contact with the aqueous sodium borohydride fuel 36 in the fuel holding chamber 28. A surface energy gradient is established through the depth of the pore 38 by making the first exterior surface 20 hydrophilic and the second exterior surface 22 hydrophobic, as explained, by suitable treatments of the surfaces with wetting-repelling agents or treatment with strong oxidizers or corona discharge. As a hydrophilic membrane is easily wetted by aqueous solutions, the aqueous fuel solution will enter the pores 38 on the hydrophilic side, that is, the first exterior surface 20 and will wet the pores until it encounters the hydrophobic portion, i.e. near or at the second exterior surface 22 of the microporous hollow fiber 18. The fuel 36 will not penetrate further into the pores 38 and is thus held from entering the hydrogen chamber 30. In addition, the application of pressure on the second exterior surface 22 of the microporous hollow fiber 18 will drive the water solution out of the pores 38. The location of the interface 44 between the fuel solution and hydrogen in the pore 38 is determined by varying the contact angle of the interface 44 with the pore interior wall 40 and the hydrogen pressure.

In the pores 38, the fuel 36 will contact the deposited catalyst particles 42 which are primarily in the portion of the pore interior wall 40 close to the hydrophobic, second exterior surface 22 of the microporous hollow fiber 18. The fuel 36 will react with the catalyst to generate hydrogen, which fills the hydrogen chamber 30 of the microporous hollow fiber 18. The generated hydrogen will build up pressure in the hydrogen chamber 30 acting on the second exterior surface 22 until it reaches a threshold pressure (the "breakthrough pressure") at which point the fuel 36 will be pushed out of the pores 38 into the fuel holding chamber 28 at the first exterior surface 10, thus stopping hydrogen generation.

The pressure at which the fuel solution is immobilized in the pores 38 and the breakthrough pressure are dependent on the diameter of the pore 38, the surface characteristics of the microporous hollow fiber 18 membrane and the interfacial tension between hydrogen and the fuel 36. When the hydrogen gas generation system 10 starts consuming hydrogen, the pressure in hydrogen chamber 30 acting on the second exterior surface 22 will drop allowing more fuel to enter the pores and contact the catalyst particles 42. This natural feedback mechanism will cause hydrogen generation to match the rate at which it is consumed. It is possible to control the rate of hydrogen generation by moving the fuel solution completely in and out of the pores 38 or by simply moving the fuel solution hydrogen interface 44 to a location in the pore 38 where there is no catalyst.

The active porous area of the hollow tube is situated so that it remains immersed in the fuel solution at all times by closing off the pores 38 in two end sections of the microporous hollow fibers 18 with the seals 24 of an epoxy or other coating or a concentric tube that seals the access to the pores 38 by the fuel 36. Only a small central section of the microporous hollow fiber 18 is accessible to the fuel 36 to prevent hydrogen leakage from the hydrophobic, second exterior surface 22 to the hydrophilic, first exterior surface 20.

This is necessary since the volume of the fuel solution decreases with hydrogen generation. Initially, the active fuel solution is a mixture of sodium borohydride, sodium hydroxide, and water, and is converted to a mixture of sodium borohydride, sodium metaborate, and sodium hydroxide as hydrogen is generated. Once all of the sodium borohydride has been converted, the fuel holding chamber 28 holds a mixture of sodium borate and sodium hydroxide in water. Since two molecules of water are consumed for each borohydride molecule during the reaction illustrated above, the mixture containing the borate salt is denser and, hence, occupies less volume than the borohydride fuel mixture. If this were not taken into account, the shrinkage in volume would expose some of the pores 38 and allow hydrogen to escape to the first exterior surface 20 side of the microporous hollow fiber 18. This would, in turn, push the remainder of the fuel into the pores 38 and create a runaway pressure situation.

Figure 2:
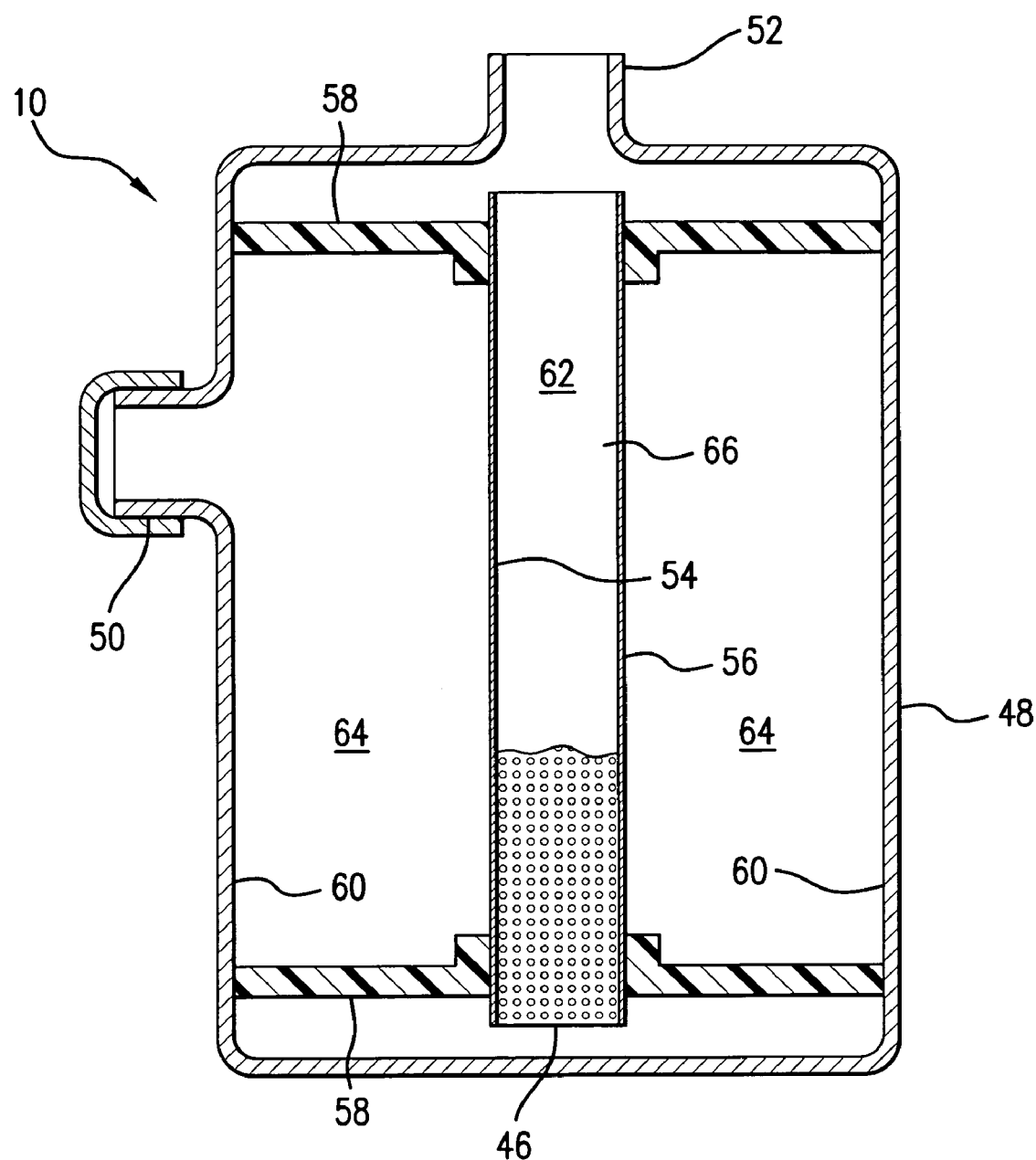
FIG. 2 is a side cross-sectional view of a hydrogen gas generation system in accordance with a second embodiment of the present invention.

Turning now to FIG. 2, there is a cross-sectional view of an alternative embodiment of the present hydrogen gas generation system 10. With this embodiment, again, only a representative microporous hollow fiber 46 is illustrated for purposes of explaining the present invention, it being understood that multiple numbers of fibers can be used, such fibers being arranged into a package or bundle.

In the embodiment of FIG. 2, the housing 48 also has an outlet 50 for removing hydrogen gas generated therein. The housing also includes a port 52. This port may be used for adding fresh fuel to or for removing spent fuel from the housing.

Microporous hollow fiber 46, having a first exterior surface 54 and a second exterior surface 56, is positioned within the housing 48 and serves as the catalyst retaining structure. Also, as with the embodiment of FIG. 1, the microporous hollow fiber 46 serves to separate the housing 48 into a fuel holding chamber 62 and a hydrogen chamber 64, the latter chamber is connected to outlet 50 which outputs the hydrogen gas generated during system operation. Thus, in the embodiment of FIG. 2, as distinguished from the embodiment of FIG. 1, the location of the fuel holding chamber and hydrogen chamber are reversed. The first exterior surface 54 is on the inner lumen wall of the microporous hollow fiber 46 and the second exterior surface 56 is on the outer surface of the microporous hollow fiber 46. The first exterior surface 54 is a hydrophilic surface and the second exterior surface 56 is a hydrophobic surface. As discussed, in reference to FIG. 1, other arrangements of hydrophobic or hydrophilic surfaces are possible, or such surfaces can be eliminated.

The microporous hollow fiber 46 is held in it position, as shown in FIG. 2, by seals 58 that are spaced apart along the longitudinal axis of the microporous hollow fiber 46. These seals may be comprised of epoxy or other sealing material that forms a tight seal against the second exterior surface 56 of the microporous hollow fiber 46 and the interior surface 60 of the housing 48.

As now can be appreciated, while only one microporous hollow fiber 46 is illustrated, there may be a bundle or package of a plurality of such fibers. In any event, in the embodiment illustrated in FIG. 2, the hydrogen gas generation system 10 is basically a shell and tube type of construction where the fuel is located within the tube in the fuel holding chamber 62 that is the internal side of the microporous hollow fiber 46 and the hydrogen chamber 64 is located on the external or shell side of the arrangement.

Figure 2A:
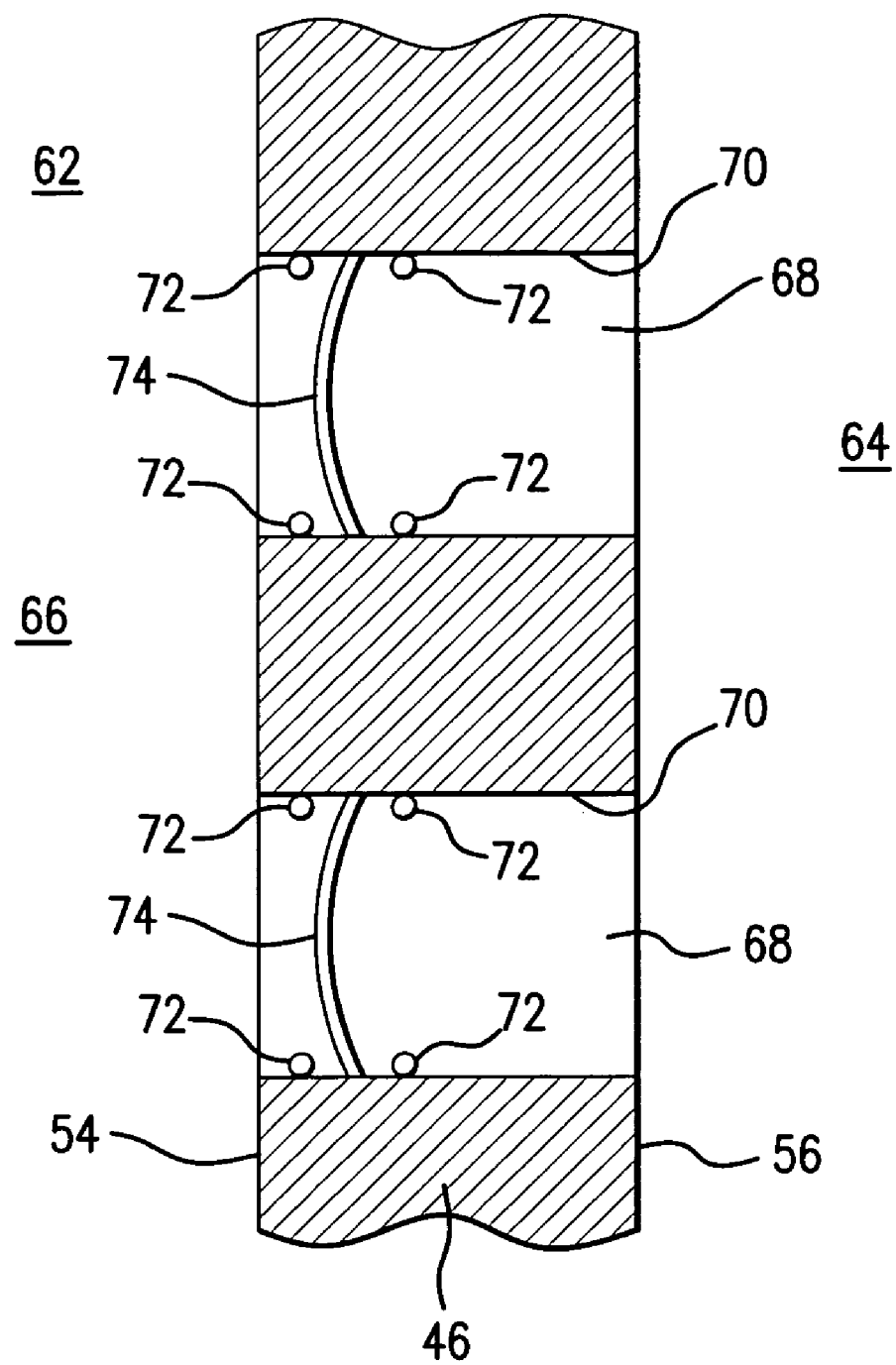
FIG. 2A is an enlarged cross-cross-sectional view of an illustrative pore in a portion of fiber 46 in the hydrogen gas generation system of FIG. 2.

Again, however, as with the prior embodiment there are a plurality of micropores and, in FIG. 2A, there is an enlarged cross sectional view of the pores 68 of the FIG. 2 embodiment with an interior wall 70 again having catalyst particles 72 disposed thereon and showing the fuel interface 74. The location of this interface within the pore can be controlled in the same manner as explained with respect to the FIGS. 1 and 1A embodiment. Thus, contact of the fuel solution 66 with the catalyst particles 72 is controlled in the manner similar to that described with respect to the FIGS. 1 and 1A embodiment, except that the fuel solution 66 is stored in the inside of the microporous hollow fiber 46 and the catalyst particles 72 are preferably in the portion of the interior wall 70 of the microporous hollow fiber 46 close to the hydrophobic, second exterior surface 56 of the microporous hollow fiber 46. The fuel solution 66 reacts with catalyst particles 72 to generate hydrogen gas that passes into the hydrogen chamber 64.

Figure 3:
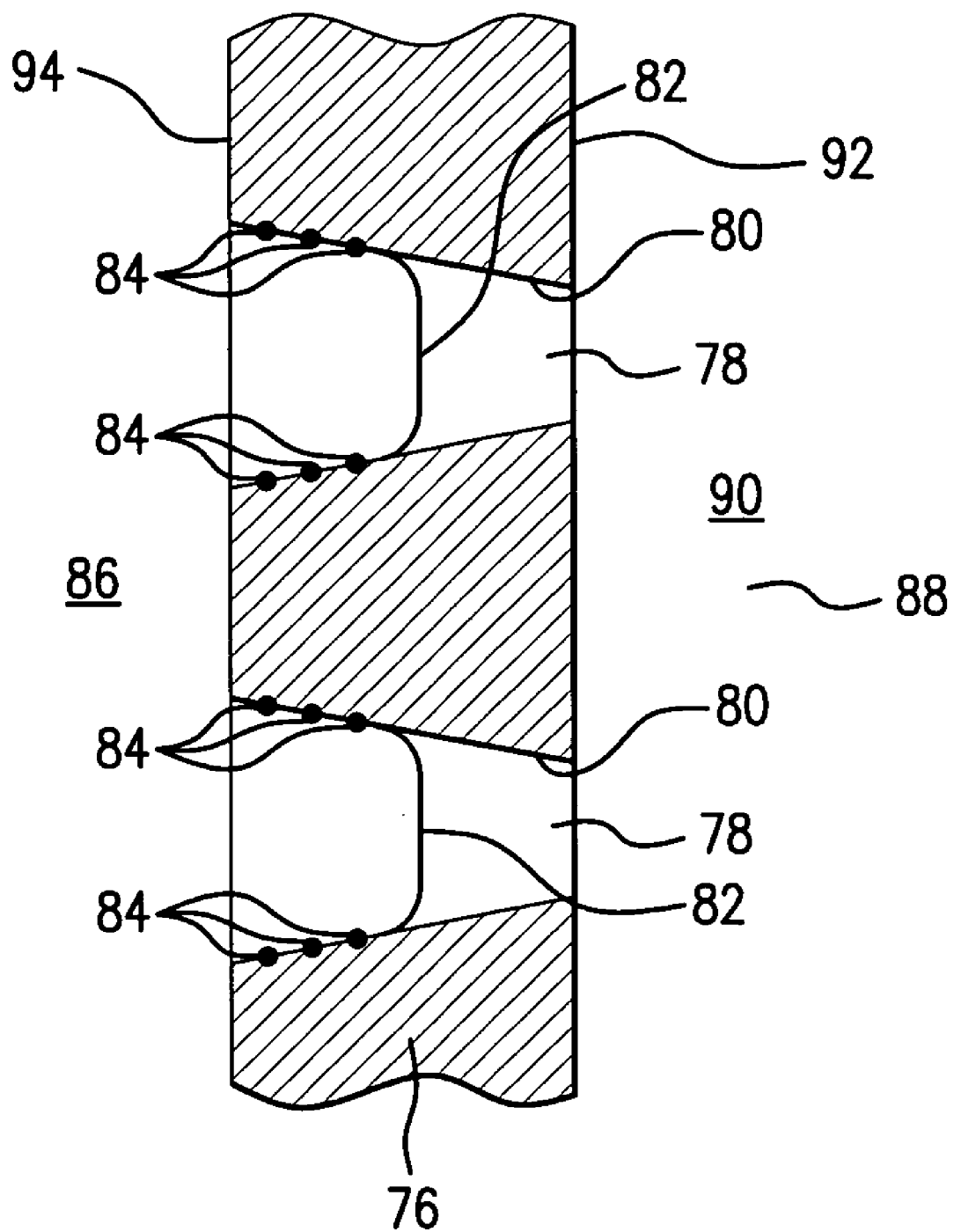
FIG. 3 is an enlarged cross-sectional view of an alternate pore configuration in a fiber portion usable with the disclosed embodiments of the present invention.

Turning now to FIG. 3, there is shown an enlarged cross-sectional view of a microporous hollow fiber 76 having a pore 78 with an internal wall 80 that is conical in cross-section along the direction of its longitudinal axis, that is, the axis that is generally normal to the longitudinal axis of the microporous hollow fiber 76. In this FIG., it can be seen that there is a fuel-hydrogen interface 82 and, again, there are a catalyst particles 84 intermediate the hydrogen chamber 86 and the fuel 88 within the fuel holding chamber 90. As shown, the orientation of the conical shaped pore 78 is consistent with the FIGS. 1 and 1A embodiment with the fuel holding chamber 90 being external or outside of the first exterior surface 92 and the second exterior surface 94 being internal and facing the hydrogen chamber 86, however, it will be readily seen that the conical shaped pore 78 could equally well be used in the reverse direction with the embodiment of FIGS. 2 and 2A. It should be noted that the shape of the interface 82 is concave with respect to second exterior surface 94. The concavity results from the fact that the surface of the internal walls 80 is hydrophilic and, therefore, the fuel solution is attracted along these walls. A convex interface with respect to second exterior surface 94 would result is the internal walls 80 were hydrophobic. This same mechanism influences the shape of the hydrogen-fuel interface in the other disclosed embodiments of the present invention.

In this embodiment, contact of the fuel 88 with the catalyst particles 84 in the pores 78 can be controlled without requiring asymmetric membranes, that is, both the first and second exterior surfaces 92, 94 can be hydrophobic. The penetration depth of the fuel 88 into the pores 78 is dependent on the following factors: the static pressure differential on either side of the liquid column in the pore, the radius of the pores, the contact angle of the fuel with the pore surface, and the surface tension of the fuel-hydrogen interface. The pressure due to the weight of the column on liquid in the pore 78 must also be considered if the pore 78 is vertical. The penetration of the fuel 88 in the pores 78 can thus be controlled by varying the pore geometry and the radius of the pores without requiring any modification of the external surfaces of the microporous hollow fiber 76. However, it is possible to use a combination of the surface modification in combination with variation in the pore geometry to control the location of the fuel-hydrogen interface 82.

The hydrogen gas generation system 10 illustrated in this embodiment can be constructed by using a plurality of microporous hollow fibers 76 consisting of microporous walls assembled in a "shell and tube" configuration or fibers with established microchannels. The pores 78 in the walls of the microporous hollow fibers 76 are conical or cylindrical such that the radius of the pores 78 increases from one end of the pore to the other through the wall of the microporous hollow fiber 76. The fuel 88 can be located in either the microporous hollow fibers 76 in the manner of FIGS. 2 and 2A or external of the microporous hollow fibers 76 in the manner of FIGS. 1 and 1A. The location of the fuel (e.g., external or internal of the microporous hollow fiber) is determined by the wettability of the fiber and pore surface by the fuel solution and the direction of the change in the pore radius (i.e., an increase from the outer tube walls to the inner lumen side or vice versa). It is also possible to modify the microporous hollow fiber 76 to incorporate both a surface energy gradient and pores with changing pore radius to control the interface immobilization.

Depending on the material of the microporous hollow fibers 76, the surfaces of the internal walls 80 may be wetted by the fuel solution. In this embodiment illustrated in FIG. 3, conical pores 78 are produced with hydrophilic internal walls 80 such that the diameter of the pores 78 decreases from the second exterior surface 94 to the first exterior surface 92. If the fuel holding chamber 90 is filled with fuel solution 88, the fuel solution will enter the pores 78, generate hydrogen as it contacts the catalyst particles 84, and the generated hydrogen will pass accumulate in the hydrogen chamber 86. As the pressure builds up on the second exterior surface 94, the hydrogen bubble, or interface 82 in the pore 78 moves towards the smaller diameter end (i.e., towards the first exterior surface 92) of the pore 78 pushing the liquid fuel front towards the first exterior surface 92. If only the portion of the pore 78 close to the second exterior surface 94 has catalyst particles 84, once the hydrogen pressure builds in the hydrogen chamber 86, the liquid fuel 88 will no longer contact the catalyst particles 84 in the pore 78 and hydrogen generation will cease. By selecting the pore geometry and size, the contact of the fuel 88 with the catalyst particles 84 can be controlled without using asymmetric membranes. Similar control can be achieved for a hydrophobic tube surfaces, in which case the radius of the pore decreases in the direction from the first exterior surface to the second exterior surface.

At this point, the fuel solution/hydrogen interface 84 is immobilized in the pore 78 at a location where there is no catalyst and at a hydrogen pressure which is determined by the pore dimensions, the surface energy of the pore walls and the fuel-hydrogen interfacial tension. When the pressure in hydrogen chamber 86 drops, the fuel solution/hydrogen interface 82 moves to contact the catalyst particles 84 and hydrogen generation is resumed. The drop in pressure in chamber 86 can drop for a number of reasons, including the consumption of the hydrogen therein by a hydrogen consuming device connected to the generator output. Similarly, when the pressure in hydrogen chamber 86 rises, the interface 82 in the pores 78 will move to a location where there is no or less fuel wetted catalyst. This causes a reduction or cessation of hydrogen generation. Accordingly, an aspect of the present invention is its ability to provide a hydrogen generation system wherein the production of hydrogen tracks the demands of a connected hydrogen consuming device.

In cases where the fiber and pore surfaces are wetted by the fuel solution, it is possible that the pores 78 will spontaneously fill with fuel solution upon initially filling the generator with fuel solution. If this occurs, the fuel solution is also likely to spill into the hydrogen chamber 86. This can be prevented by a number of ways: The microporous hollow fibers 78 can be initially filled with a non-wetting liquid at a pressure such that the liquid forms an interface at the mouth of the pore 78 on or at the second exterior surface 94. When the fuel solution enters the pores 78, the non-wetting liquid interface is at a higher pressure than the fuel solution and will prevent a spill-over of the fuel solution 88 into the hydrogen chamber 86. At the same time, the fuel solution 88 will start generating hydrogen due to its contact with the catalyst.

As the pressure of this hydrogen increases, the non-wetting liquid is gradually displaced from the microporous hollow fibers 76. Once the hydrogen displaces all the liquid in the fibers, the hydrogen pressure can be used to prevent spill-over and regulate hydrogen production. When this pressure exceeds the liquid fuel pressure by the breakthrough pressure, the fuel/hydrogen interface 82 in the pore 78 is pushed towards the first exterior surface 92 and causes the fuel solution to move out of contact with the catalyst particles 84. The spill-over of the fuel into the hydrogen chamber 86 may also be prevented by coating the inside, second exterior surface 94 by a very thin non-porous hydrogen permeable membrane. There are other methods known in the art that can be used to achieve a well-defined interface in the pores or at the pore mouth. In the case of hydrophobic tube surfaces, it may be necessary to force the fuel solution into the pores by pressure or by using wetting agents The active porous area of the microporous hollow fibers 76 is situated so that it remains immersed in the fuel 88 at all times thus preventing hydrogen leakage from one side into the fuel side. This is essential, since the volume of the fuel solution shrinks upon discharge. If this was not taken into account the shrinkage in volume would allow pores 78 to become exposed and hydrogen would escape to the fuel holding chamber 90. This, in turn, would push the remainder of the fuel 88 into the pores 78 creating a pressure runaway situation. This is prevented by maintaining only a small central section of the microporous hollow fibers 76 accessible to the fuel and closing off the microporous hollow fibers 76 in two end sections by seals 96 of an epoxy or other coating or a concentric tube that seals the access to the pores 78 by the fuel 88. These dimensions are based on the level of the fuel at maximum shrinkage in any orientation. Using a multitude of microporous hollow fibers in the assembly reduces the diffusion path length of the fuel 88 to the catalyst pores.

It should be noted that though this embodiment describes a system with microporous hollow fibers 76 tubes with a hydrophilic surface and pores 78 that increase in radius from the first exterior surface 92 facing the fuel holding chamber 90 to the second exterior surface 94 facing the hydrogen chamber 86, the system of this embodiment could also be constructed from microporous hollow fibers that are non wetting to the fuel or in which the pore geometry is reversed (i.e., decreases in radius from the outer shell wall to the inner tube wall) or in which the fuel solution is stored in the fiber and operated in the same fashion. In each of the cases it is possible to immobilize the fuel solution interface 82 in the pores 78 using techniques that are known in the art.

Figure 4:
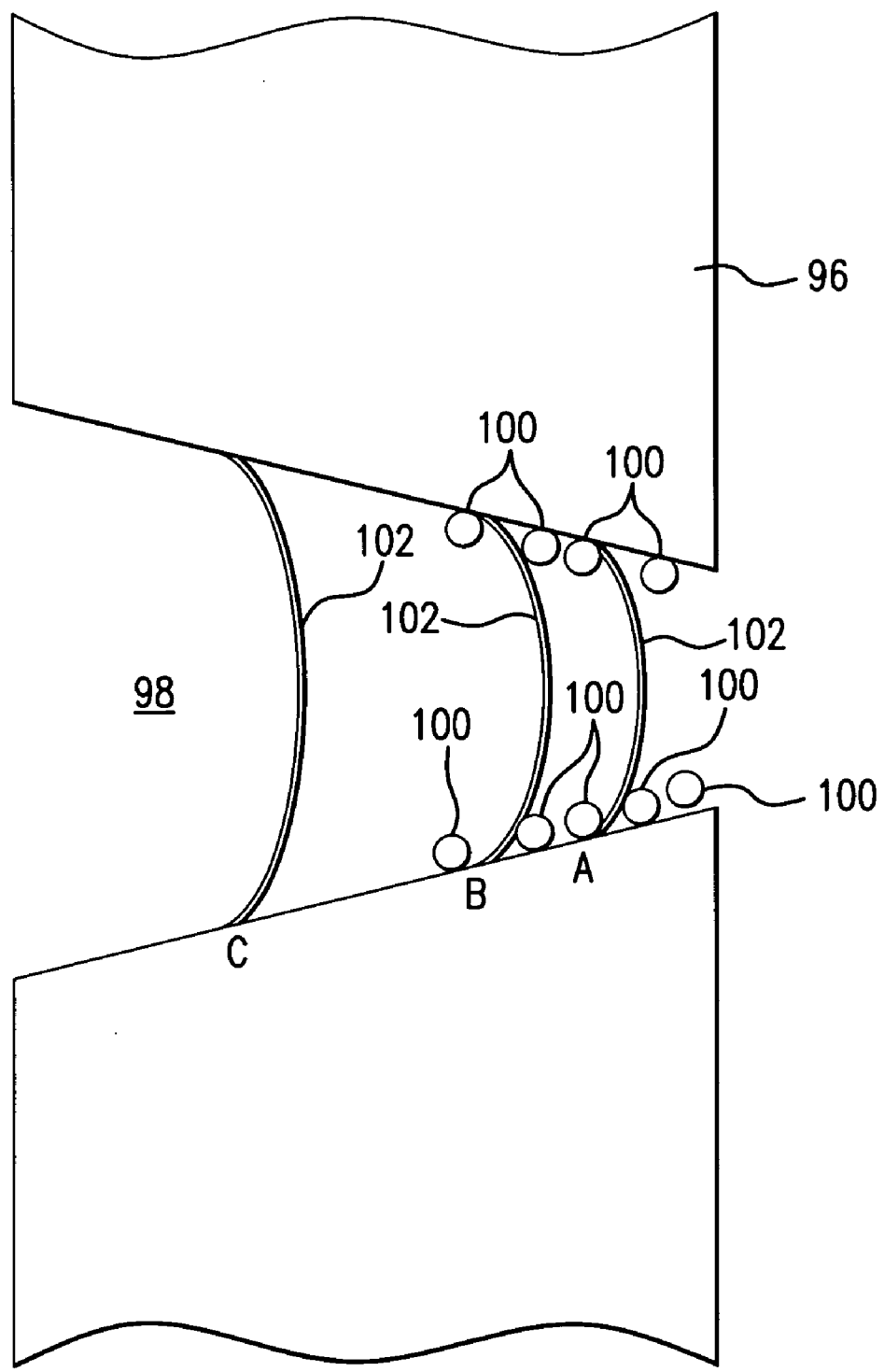
FIG. 4 is a schematic, enlarged view of the pore configuration of FIG. 3 representing an illustrative flow of fuel solution into the pore.

Turning next to FIG. 4, there is shown a schematic view of a microporous hollow fiber 96 having formed therein a single hydrophobic conical pore 98 in order to illustrate the dynamics of the overall interaction of the fuel with the conical pore 98. Within the conical pore 98, there can also be seen the catalyst 100 and the fuel solution-hydrogen interface 102 that forms a meniscus within the conical pore 98.

The contact of the fuel with the catalyst in the pores is controlled by using specific pore geometries and/or pore dimensions or surface properties of the pore walls. According to the Young Laplace equation:

$$P_{cr} = 2\gamma \cos \theta / r p$$

$P_{cr}$=Break through pressure; for a cylindrical pore of constant radius, when the pressure of the phase not in the pore exceeds the pressure of the phase in the pores by this value it will displace the fluid in the membrane pores.

$\gamma$=the interfacial tension between the 2 phases (fuel solution and hydrogen) in the pore $\theta$=the contact angle measured from the pore wall to the tangent of the 2 phase interface drawn from the three phase contact point at the pore wall into the pore fluid $r_p$=pore radius If the pores of the hollow reactor are cylindrical with a radius of $r_p$ and the fuel solution wets the pores, the application of pressure on the fuel solution in the pores that exceeds the fuel solution pressure by $P_{cr}$ will push the fuel solution out of the pores. Instead of cylindrical pores of constant radii, if the pores increase or decrease in radius from one end of the pore to the other, the breakthrough pressure can be varied along the pore depth. The hydrogen generation can be regulated by immobilizing the fuel solution/hydrogen interface at a location in the pore where there is no catalyst present.

As can be seen, therefore, in FIG. 4, a single hydrophobic conical pore 98 is shown. When the fuel solution-hydrogen interface 102 is located at "A" the hydrogen pressure is balanced by the fuel pressure $P_f$ according to the following equation:

$$P_{H2} = P_f - 2\gamma \cos \theta / r_{p1} \text{ where } r_{p1} \text{ is the radius of the pore at that location.}$$

However, since the fuel solution is in contact with the catalyst at location A it will continue generating hydrogen and if there is no consumption of hydrogen its pressure will increase such that $P_{H2} > P_f - 2\gamma \cos \theta / r_{p1}$ at location A. This will cause the interface 102 to be pushed backwards. Note that the pore radius is increasing in the direction that the interface 102 is being moved so it is possible to establish a new equilibrium position at location B, where $P_{H2} = P_f - 2\gamma \cos \theta / r_{p2}$. Again, since the fuel solution is still in contact with catalyst 100 at this new location the equilibrium will be disturbed by the increase in hydrogen pressure and the interface will be further pushed back to location C. Since there is no catalyst present at this location, the fuel solution/hydrogen interface 102 will remain immobilized. A drop in hydrogen pressure due to consumption by a fuel cell, will disturb the equilibrium in favor of the fuel pressure and which will push the interface inwards (to the left in FIG. 4) until the fuel solution contacts the catalyst 100 and generates hydrogen to meet the fuel cell demand.

Figure 5:
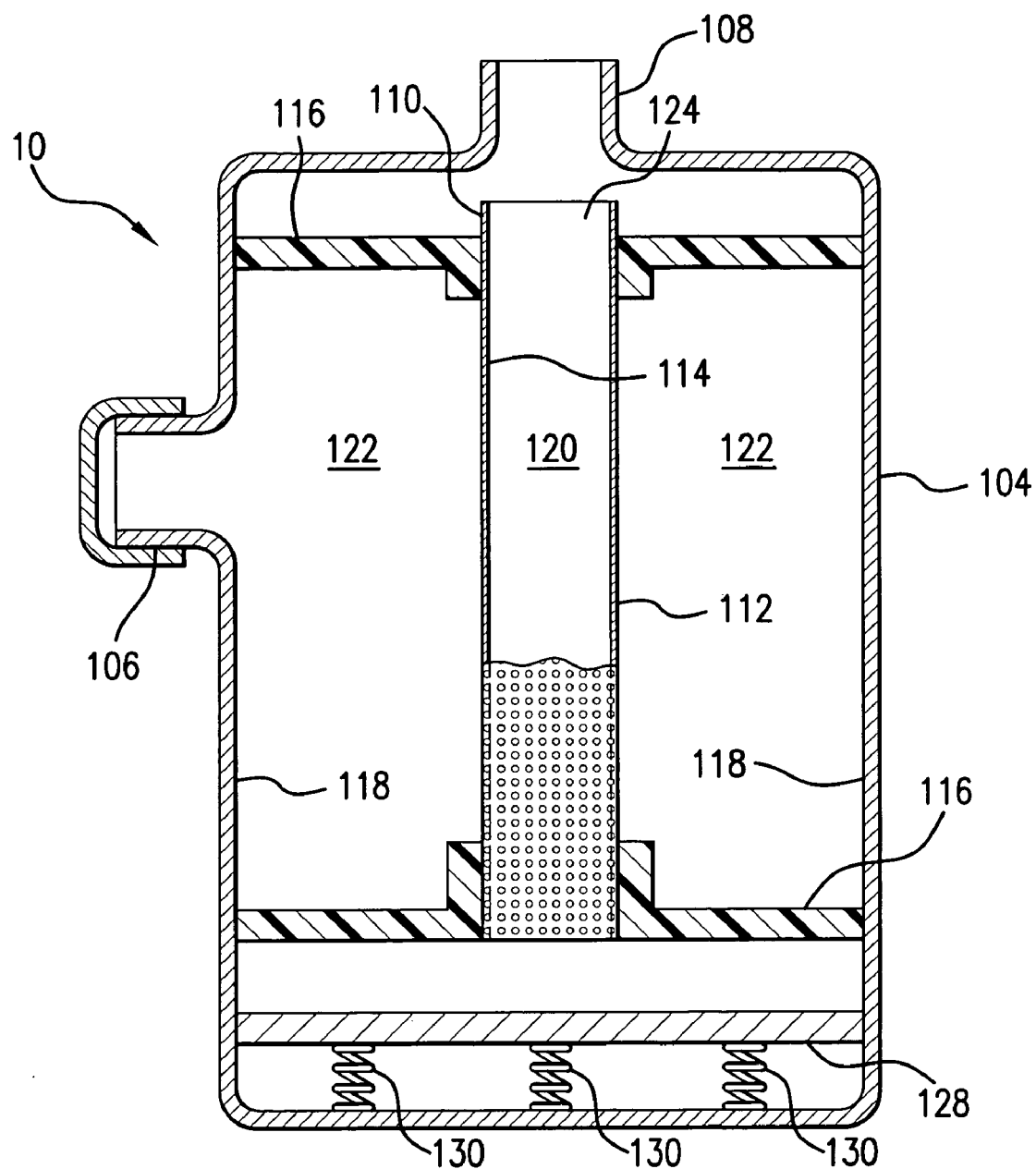
FIG. 5 is a side, cross-sectional view of a hydrogen gas generation system in accordance with a third embodiment of the present invention.

Turn now to FIG. 5 which shows a cross-sectional view of another embodiment of the present invention. The physical structure of most of the components of the FIG. 5 embodiment are similar to the FIGS. 2 and 2A embodiment and, therefore, the following description is a summary of those similar components with the more detailed explanation having been provided with respect to FIG. 2.

Accordingly, the hydrogen gas generation system 10 comprises a housing 104. There is a outlet 106 formed in the housing 104 for removal of the hydrogen gas generated within the housing 104 and a port 108 formed therein that can be used to add fresh fuel to the housing 104 or to remove spent fuel therefrom.

Microporous hollow fiber 110, having a first exterior surface 112 and a second exterior surface 114, is positioned within housing 104. In this embodiment, both the first and second exterior surfaces 112, 114 are hydrophobic surfaces. The microporous hollow fiber 110 is held in it position within the housing 104 by seals 116 that are spaced apart along the longitudinal axis of the microporous hollow fiber 110 and the seals 116 may be comprised of epoxy or other sealing material that forms a tight seal against the first exterior surface 112 of the microporous hollow fiber 110 and the interior surface 118 of the housing 104.

Thus, the microporous hollow fiber 110 serves to separate the housing 104 into a fuel holding chamber 120 and a hydrogen chamber 122. The latter chamber, that is, the hydrogen gas chamber 122 communicates with the outlet 106 for recovery of the hydrogen gas from the hydrogen gas generation system 10 during its operation.

As with the FIG. 2 embodiment, while only one microporous hollow fiber 110 is illustrated, there may be a bundle or package of a plurality of such fibers. In any event, as with the FIG. 2 embodiment, this embodiment utilizes a shell and tube type of construction where the fuel is located in the fuel holding chamber 120 that is the tube side of the microporous hollow fiber 110 and the hydrogen chamber 122 is located on the shell side. However, unlike the FIG. 2 embodiment, in this embodiment, both the first exterior surface 112 and the second exterior surface 114 are hydrophobic surfaces.

Figure 5A:
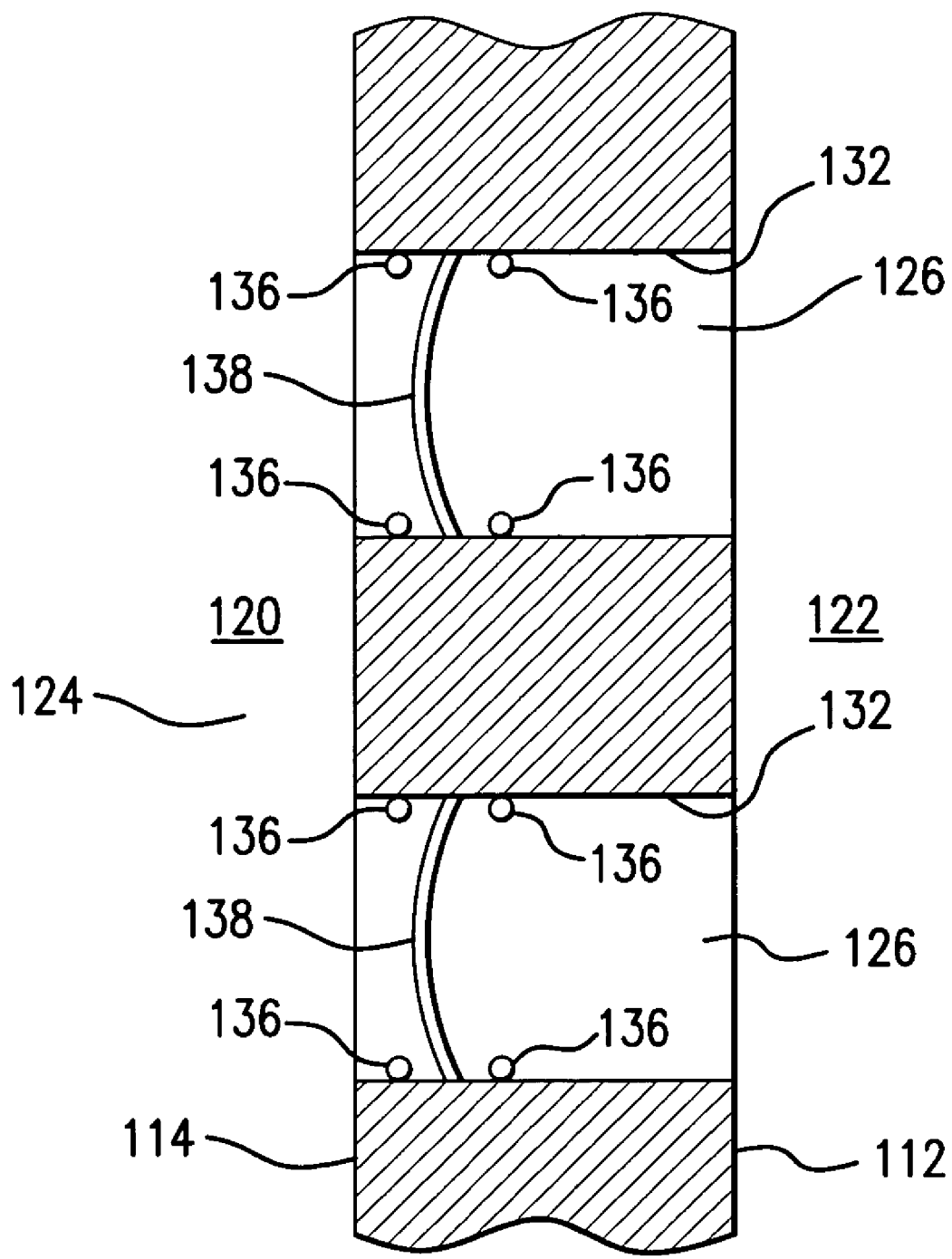
FIG. 5A is an enlarged cross-sectional view of an illustrative pore in a fiber portion in the FIG. 5 embodiment.

Since the first and second exterior surfaces 112, 114 are hydrophobic, a mechanism is required to increase the pressure within the fuel holding chamber 120 so that the fuel solution 124 is forced through the pores 126, shown in FIG. 5A, of the microporous hollow fiber 110.

In this embodiment, the surface properties of the microporous hollow fiber 110 and the pore radius is constant across the length of the pores 126. Again the fuel 124 can be stored inside, that is, internal, or outside, external of the microporous hollow fiber 110.

The structure to increase the pressure within the fuel holding chamber 120 can be by a variety of means, including elastic bladder or bladders that are inflated to increase that pressure or, as shown in FIG. 5, there can be a plate 128 that is biased inwardly toward the fuel holding chamber 120 to increase the pressure therein. The bias for the plate 128 can be supplied by means of a spring 130.

Again, turning to FIGS. 5 and 5A, the internal wall 132 of the pore 126 is coated with catalyst particles 136 as with the prior embodiments and the hydrogen-fuel solution interface 138 is located therein. The pressure increasing means can also be used if the embodiment were reversed so as to have the fuel holding chamber located external to the microporous hollow fiber 110 as in the FIG. 1 embodiment, such that there may be a plate or inflatable bladders located so as to increase the pressure within that external fuel holding chamber.

Figure 6:
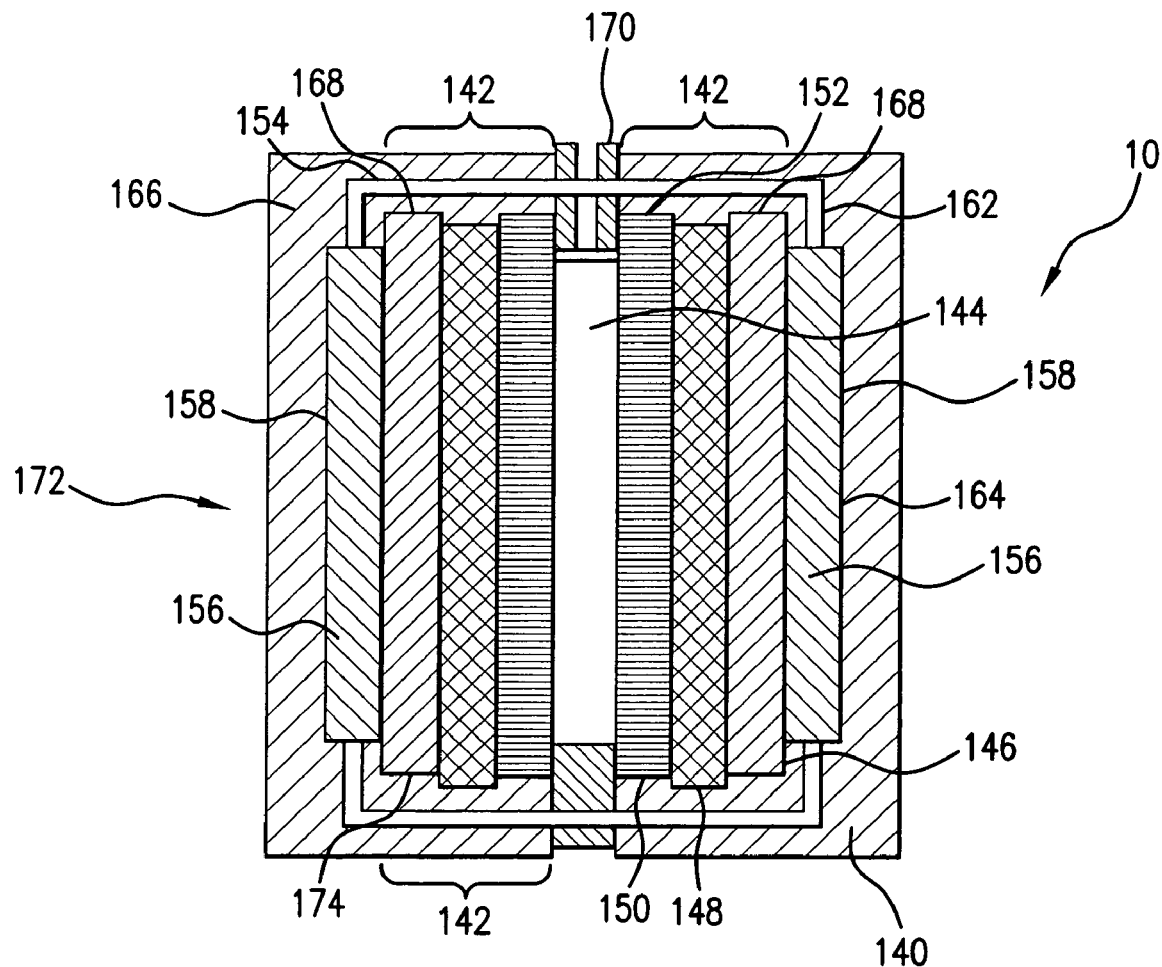
FIG. 6 is a side cross sectional view of a hydrogen gas generation system in accordance with a fourth embodiment of the present invention.

Turning now to FIG. 6, there is shown a cross-sectional view of a still further embodiment of the present invention. In this embodiment, the microporous members of the hydrogen gas generation system 10 are constructed in a parallel plate configuration rather than circular microporous hollow fibers. A single cell generator 140 is shown for clarity in FIG. 6 where each cell generator 140 consists of two plate sets 142 of porous parallel plates separated by a hydrogen ballast chamber 144.

A plate set 142 consists of a microporous hydrophilic flat plate 146 made from polymeric or other material that is compatible to the fuel solution and is wetted by the fuel solution. The micropores in the microporous hydrophilic flat plate 146 are cylindrical or conical or of a random shape. A microporous catalyst plate 148 is located adjacent to the hydrophilic flat plate 146 and in intimate contact with it. The fuel solution will generate hydrogen when it is in contact with the catalyst that is deposited in the pores or the surface of this catalyst plate 148. A hydrophobic sheet 150 is placed adjacent to the catalyst plate 148 on the side opposite the hydrophilic flat plate 146, such that the porous catalyst plate 148 is sandwiched between the microporous hydrophilic flat plate 146 and the hydrophobic sheet 150. The hydrophobic sheet 150 may be micro porous or simply made from material that has a high permeability for hydrogen.

Each plate set 142 may be assembled by laminating the hydrophilic flat plate 146, the catalyst plate 148 and the hydrophobic sheet 150 together or by casting a frame around the outer edge of the plates. It is important that intimate contact be maintained between the surfaces of the three components, i.e., the hydrophilic flat plate 146, the catalyst plate 148 and the hydrophobic sheet 150 that make up the plate set 142. Any number of methods that are known in the art can be used to assemble the plates together.

A single cell generator 140 is formed by the assembly of two plate sets 142 such that the hydrophobic surfaces of each plate set 142 set face each other at a predetermined distance. The outer edge 152 of the hydrophobic sheets 150 of each plate set 142 are sealed against a central frame 154 of desired thickness. The hydrogen ballast chamber 144 is formed in between the plate sets 142. A fuel solution 156 is stored in a fuel holding chamber 158 adjacent to and in contact with the hydrophilic flat plate 146. The fuel holding chamber 158 in a single cell generator 140 is formed by sealing the outer edge of each plate set 142 against the inner edge 160 of a first end plate 162.

The central portion 164 of the first end plate 162 is recessed and the fuel solution 156 is stored in the fuel holding chamber 158 that is formed between the end plate 162 and the plate set 142.

Similarly, the inner edge of a second end plate 166 is sealed against the outer edge 168 of the hydrophilic flat plate 146 of the other plate set 142. The recessed portion of the second end plate 166 contains the fuel solution 156 that is in contact with the hydrophilic flat plate 146 of the other plate-set 142. The outer edges of the first and second end plates 162,166 are sealed together by a seal 170 thus forming a housing 172 for the plate sets 142. Hollow channels 174 in the end plates 162 and 166 are arranged to allow the fuel solution 156 in the separate fuel holding chambers 158 to be in direct communication with each other. To provide this communication in any orientation, it is preferable to provide at least four hollow channels 174. In FIG. 6, two channels 174 are shown. In addition, there are also two other channels 174 that are not shown and which are in front of and in back of the illustrated cross section. Accordingly, each pair of plate cells in a unit cell has channels 174 that are above, below, to the left, and to the right of that unit cell.

The construction of a multi-cell hydrogen generator is similar to the single cell device described above with multiple single cell units, stacked adjacent to each other in a prismatic construction. In such case, multiple frame sections are used to seal the inner cells. The frame section on which two hydrophobic sheets are sealed forms the hydrogen ballast chamber in the single cell. The hydrophilic flat plates of the inside cells are also sealed on a frame section and the fuel holding chamber thus formed is used to store the fuel. Holes in the frame section allow the fuel solution in each cavity and the hydrogen ballast in each cell to be manifolded. End plates similar to the ones described for a single cell are used for the outermost cells in a multi-cell construction.

Though the construction of the embodiment of FIG. 6 is described as using three discrete plates that are either laminated or held in close proximity to one another, the properties of the individual plates can be combined in a single plate by depositing catalyst in the pores and making the opposite surfaces of the plate asymmetric. It is also possible to use an outer plate that is also made from hydrophobic material or of a pore size that may require the fuel to be pressurized to penetrate the pores. Incorporating a spring mechanism in the end plate design as shown in FIG. 5 allows the fuel solution to be maintained at a predetermined pressure level. For safety pressure relief valves are incorporated in the hydrogen ballast and fuel sections of the generator to vent any excess pressure build-up during operation.

The flat plate hydrogen generator operates in a similar manner to the tubular generators described with respect to the prior embodiments. Fuel solution 156 that is adjacent to the micro porous hydrophilic flat plates 146 will spontaneously wet and fill the pores in the hydrophilic flat plates 146. When the fuel solution 156 contacts the catalyst it will generate hydrogen which will permeate the hydrophobic sheet 150 and accumulate in the hydrogen ballast chamber 144. The pore size and surface characteristics of the hydrophobic sheet 150 is chosen such that the fuel solution 156 will not penetrate this surface.

The pore size, surface characteristics and plate thickness of the hydrophilic flat plate 146 is chosen such that, when the hydrogen pressure reaches the breakthrough pressure the fuel solution 156 is pushed away from the catalyst and moves back into the pores of the hydrophilic flat plate 146. The fuel solution-hydrogen interface is maintained in the pores of the hydrophilic flat plate 146 and no hydrogen is allowed to bubble out and accumulate in the fuel holding chamber 158 of the generator 140. When the hydrogen pressure drops due to consumption by the fuel cell, the fuel interface in the pores moves to contact the catalyst and generate additional hydrogen to keep up with the consumption demand. Thus the hydrogen production by such a generator 140 is self-regulating and governed by its demand at the consuming device.

The volume of hydrogen stored in the hydrogen ballast chamber 144 is designed to meet the instantaneous response requirement of the fuel cell or other hydrogen-consuming device. It is important to note that the fuel solution adjacent to the hydrophilic flat plate 146 in each cell generator 140 is maintained as a thin film of fuel to minimize the path lengths for diffusion of sodium borohydride fuel and removal of borate product from the catalyst surface.

Figure 7:
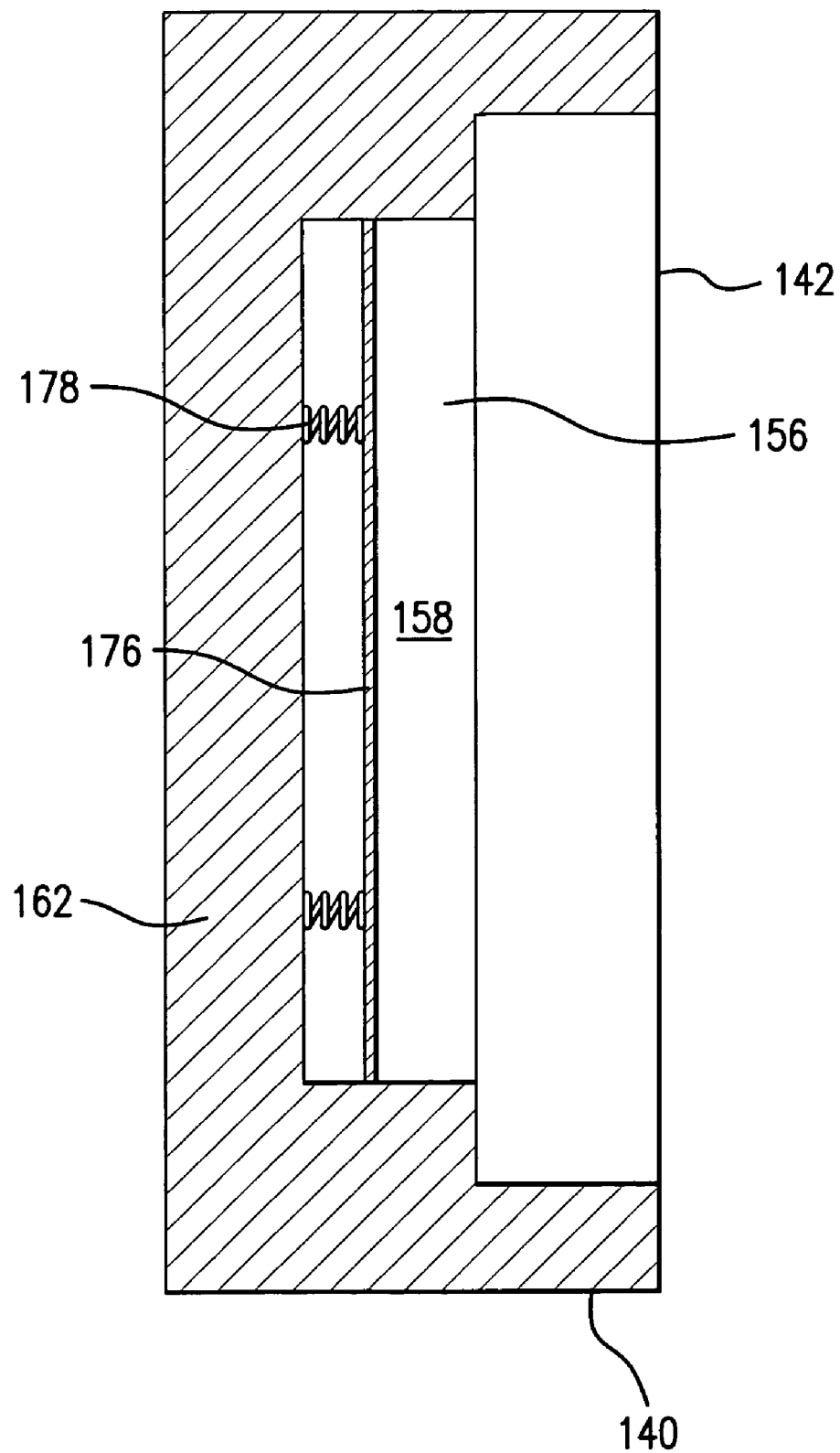
FIG. 7 is a side cross-sectional view of a structure for raising the pressure within a fuel holding chamber in the embodiment of FIG. 6.

Finally in FIG. 7, taken along with FIG. 6, there is a cross-sectional view of a structure to maintain a positive pressure in the fuel solution 156 in the FIG. 6 embodiment to keep the fuel solution 156 in contact with the outer surface of the plate set 142 to maintain the flow of fuel solution through the single cell generator 140. As can be seen, there is a plate 176 that is biased inwardly toward the fuel holding chamber 158 to apply pressure against the fuel solution 156 contained therein to force it through the plate set 142. Again the bias may be exerted by springs 178 as shown, or may be inflatable bladders, gas charged pistons or wafer springs or the like. Alternatively, a ribbon spring, a preformed piece of flexible plastic, an elastic bladder or similar material that has an intrinsic tension could also be used.

In the embodiment of FIG. 6, the fuel holding chamber 158 is located external of the plate sets 142, however, it can be seen that the function may be reversed with the fuel chamber located internal of the plate sets 142 and the hydrogen ballast chamber located external of the plate sets 142, in which case, the pressure generating structure can be relocated so as to apply the pressure against that fuel located within an internally oriented fuel holding chamber.

In addition, a piezoelectric crystal may be incorporated into the fuel holding chamber of any of the above described embodiments that is adapted to flex in response to an electric current flow through it. The resultant vibration can dislodge any clogs that may occur within the micropores.

While the present invention has been described with reference to particular embodiments, other variations are possible without departing from the sport and scope of the present invention. For example, while a single, centrally disposed hollow fiber module comprising one or more fibers is shown in FIGS. 1 and 2, any number of hollow reactor modules may be used and their position can be disposed virtually anywhere within the structure which provides for the contact of the fuel solution with each hollow reactor. Second, while FIGS. 1 and 2 show a single port for the entry and discharge of liquid fuel, additional ports may be used. For example, one or more ports may be used for the entry of fuel and other ports (not shown) may be used for the discharge of fuel. Accordingly, fuel may be continuously circulated into and out from the container shown in FIGS. 1 and 2. Third, if desired, the arrangement of FIGS. 1 and 2 can be modified to permit removal of the bottom portion of the container in FIG. 1 by unthreading or the like so that the hollow tube modules may be washed to remove any contamination of the hollow reactors. Such washing is intended to restore the capabilities of the retained catalyst for hydrogen generation and would typically be done while the hydrogen generator is not in service. Or, in lieu of catalyst washing, the generator can be modified to permit the removal and replacement of the hollow tube module. Fourth, while the disclosed embodiments utilize a plurality of pores, the present invention is applicable to a catalyst retaining structure having one or more pores. Fifth, any embodiment of the present invention can incorporate pressure relief valves in either one or both of the fuel holding and hydrogen chambers. Sixth, while reference has been made to the use of "micropores", i.e., pores wherein the Young Laplace equations regulate the contact of the fuel with the catalyst, the present invention is also applicable to other sized pores where such equations are not controlling. In such cases, other regulation arrangements may be necessary to control the contact of the fuel solution with the catalyst and thereby regulate the hydrogen generation rate. One such other arrangement for doing this would be to move the entire catalyst retaining member into and out of the fuel solution in response to the pressure of the generated hydrogen. Finally, it should be appreciated that the hollow reactors may be of any configuration so long as the bundle or package of multiple fibers in a reactor permits the fuel solution to wet the exterior surface of each fiber in that reactor.

We claim:

1. A hydrogen gas generator comprising:
   (a) a housing;
   (b) a member comprising at least one set of flat plates which separates said housing into a fuel holding chamber and a hydrogen chamber, wherein each of the at least one set of flat plates comprises a hydrophilic plate, a catalyst plate, and a hydrophobic plate, said plate set being laminated together, and said hydrophilic plate having a first surface facing the fuel holding chamber and said hydrophobic plate having a second surface facing the hydrogen chamber, said hydrophilic plate having at least one first pore formed therein which communicates with said first surface and said catalyst plate, said catalyst plate having at least one second pore formed therein which communicates with said hydrophilic plate and said hydrophobic plate;
   (c) a fuel solution in said fuel holding chamber;
   (d) said catalyst plate having a catalyst disposed on the surface which promotes the generation of hydrogen upon contact with said fuel solution; and
   (e) said fuel holding chamber being structured to permit fuel solution movement to said first surface such that said fuel solution passes into said first pore thereby contacting the catalyst on said catalyst plate to generate hydrogen which passes into said hydrogen chamber.

2. The hydrogen gas generator of claim 1 wherein said hydrophobic plate is permeable to hydrogen.

3. The hydrogen generator of claim 1 wherein said plate set is held together in a frame.

4. The hydrogen generator of claim 1 wherein said catalyst is disposed within said at least one second pore.

* * * * *